Jan. 28, 1969   D. W. BEEKEN   3,423,840
CONE TRAY HEAT EXCHANGER
Filed Oct. 20, 1966

INVENTOR.
DAVID W. BEEKEN
BY:

D. M. Mezzapelle

ATTORNEY.

United States Patent Office 3,423,840
Patented Jan. 28, 1969

3,423,840
CONE TRAY HEAT EXCHANGER
David William Beeken, Croydon, England, assignor to Dorr-Oliver Incorporated, Stamford, Conn., a corporation of Delaware
Filed Oct. 20, 1966, Ser. No. 588,124
Claims priority, application Great Britain, Oct. 21, 1965, 44,686/65
U.S. Cl. 34—10                          9 Claims
Int. Cl. F26b 3/08, 17/14, 3/16

ABSTRACT OF THE DISCLOSURE

Process and apparatus for countercurrent treatment of solid material with gases, said apparatus provided with a plurality of upwardly facing cones and downwardly facing trays arranged so that the solid material passes downwards in cascade over the inclined surfaces and means for adjusting the position of the cones relative to the trays.

---

This invention relates to improvements in the process and apparatus for treating solid materials in a fluidized bed reactor and particularly to improvements for effecting heat exchange between said solid material and gases either prior or subsequent to fluidization.

This invention finds particular application when preheating or cooling a particulate solid material such, for example, in the calcination treatment of limestone, phosphate rock, and fire clay, in sand reclamation, and other applications.

It has been proposed and indeed is a well known practice in fluidized bed technology to heat treat particulate solid material in a multi-compartment fluidized bed reactor. In its simplest form, such reactors comprise three superimposed compartments namely an upper preheat compartment, an intermediate calcination compartment and a lower cooling compartment, each containing a fluidized bed generally of the material to be treated.

In the operation of such reactors the material to be treated is fed into the top compartment wherein it is preheated by the hot gases rising from the intermediate calcining compartment. Thereafter, the preheated solids are transferred into the intermediate compartment for calcination treatment and eventually into the lower compartment wherein the hot solids come in contact with the incoming generally cool fluidizing gases.

While this prior system has proven to be commercially successful mainly because it permits a combination of the calcination step with the heat recovery step it suffers from a number of disadvantages among which is that because of the transfer of solids from compartment to compartment, there is a tendency for scaling and eventual plugging of the transfer pipes and tuyeres in the constriction plate necessitating periodic shut-down and cleaning.

Accordingly it is an object of this invention to provide a process and apparatus which overcomes the disadvantages of the prior art yet provides efficient heat exchange means which can be used in association with fluidized bed apparatus.

Another object is to provide a fluidized bed reactor in which the heat exchange means of this invention is substituted for the preheat and/or cooling fluidized beds.

These and other objects and advantages, which will appear as the specification proceeds, are attained by the present invention which according to one aspect provides an apparatus for the countercurrent treatment of particulate solids material with gases the apparatus provided with a plurality of upwardly facing cones and downwardly facing conical trays arranged so that the solid material can pass downwards in cascade over the inclined surfaces and means for passing gas upwards in countercurrent flow with the solid material, the inclined surfaces being arranged so that the solid material passes across the path of gas flow in passing from one inclined surface to another.

The angle of inclination of the inclined surfaces should be substantially greater than the angle of repose of the solid material.

Due to the passage of the material across the gas flow path, there will be fairly intimate mixing of the falling solid material with the gas which is intensified by the throw-back of the falling material; this throw-back can be controlled by arranging the apparatus such that the gas flow path is restricted at a place where the solid material will fall into the gas flow path, thus controlling the gas velocity at this place. With such throw-back intimate mixing can be achieved, normally with each individual particle put in intimate contact with the gas.

It can be shown that in the finer particle size range, required for fluidization, heat exchange will be so rapid as to be almost instantaneous, but, with the throw-back that can be achieved in the apparatus of this invention, the contact time can be greatly extended so that a high heat transfer is possible over the entire fluidizable range.

Compared with fluidized beds the apparatus of the invention can be arranged such that the power consumption and capital costs are reduced, and as no tuyeres or transfer pipes are employed in the preheating or cooling compartment the scaling of tuyeres and plugging of transfer pipes is avoided.

Preferably the inclined surfaces may be formed by a plurality of successive upward facing cones and downward facing conical trays so dimensioned that the solids would flow over the base of the cones, or over the lips of the tray apertures, as a thin screen of material say between 1/8" and 3/8" in thickness in opposition to the rising gas stream which would throw back most of the solid mass on to the sloping surfaces of the trays by virtue of the high velocity of the gas stream passing through the restricted apertures between the bases of the cones and the lips of the trap apertures.

By arranging for the cone positions to be adjustable, in a vertical plane relative to the tray surfaces, the velocity of the rising gases can be controllable to within desired limits which could be 15 to 35 f.p.s., depending on the particle size of the material being handled. On passing the restricted zone (around the restricted apertures) there would be an immediate drop in gas velocity and a corresponding disengagement of the solids in the stream so that there would be little, if any, elutriation of the particles into the stage above. Generally therefore, solids would thus be held in each section till a state of equilibrium is reached between weight of solids and the rising gas force, after which, solids will filter past into the next stage, against the rising stream.

For withdrawal purposes it is preferred that the cone base diameters be slightly less than that of the tray apertures.

According to a second aspect of this invention, there is provided a fluidized bed apparatus having the heat exchange apparatus as heretofore mentioned arranged to preheat particulate solid material fed to the fluidized bed with the feed passed in countercurrent with hot gases leaving the fluidized bed, and/or having heat exchange apparatus as heretofore mentioned arranged to preheat gas fed to the fluidized bed with the gas passed in countercurrent with the solid product discharged from the fluidized bed.

A third aspect of this invention is to provide a method of passing a particulate solid material in heat-exchange relationship with a gas, using apparatus according to the first aspect of the invention.

The invention will be further described, by way of example, with reference to the accompanying drawings, of which:

Figure 1:
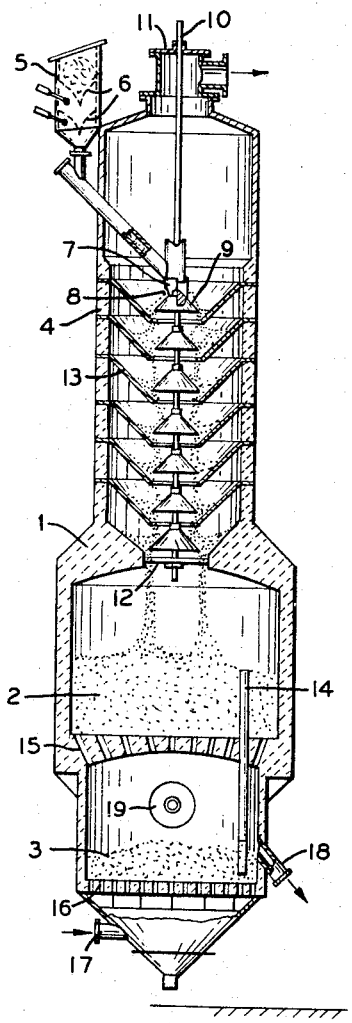
FIGURE 1 is an elevation, mainly in vertical section, of a fluidized bed apparatus incorporating heat-exchange apparatus in accordance with the invention to preheat the solid feed.

The apparatus of FIGURE 1 is arranged for calcining limestone. The apparatus has a refractory supporting structure encasing a main fluidized bed 2, a fluidized bed 3 for preheating the combustion air and a cascade heat-exchange tower 4 for preheating the solid feed.

Damp, particulate solid feed is fed into a hopper 5 having mechanically-operated double shut-off flaps 6, from which it passes into a feed distributor 7 having a number of orifices 8 for distributing the feed fairly evenly around the top of the uppermost cone 9.

As shown in FIGURE 1, the heat-exchange tower 4 has a number of cones 9, mounted on a vertical shaft 10 which is vertically adjustable and supported in a top plate 11 and a bottom spider 12; these cones 9 cooperate with annular, frusto-conical trays 13, the openings in the trays 13 being of slightly larger diameter than the maximum diameter of the cones 9.

The feed passes downwardly over the upper surfaces of the cones 9 and of the trays 13, until it reaches the spider 12, when it passes into the fluidized bed 2.

The action of the fluidized beds 2 and 3 is well-known, and need not be described in detail. The fluidized bed 2 is provided with oil injection points (not shown in FIGURE 1, but referenced as 28 in FIGURE 3), with a transfer pipe 14 and with tuyeres 15; the fluidized bed 3 is provided with tuyeres 16, an air inlet duct 17, a product outlet opening 18 and a start-up burner 19.

Figure 2A:
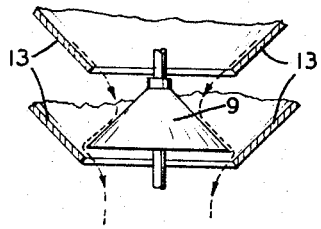
FIGURES 2a and 2b show details of the apparatus of FIGURE 1, illustrating the throw-back effect on the inclined trays.
Figure 2B:
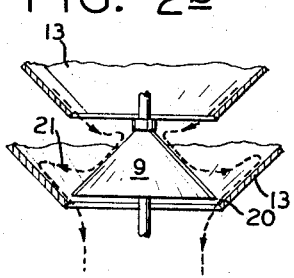

The action in the heat-exchange tower 4 is shown in FIGURES 2a and 2b. FIGURE 2a shows what happens if there is no gas flow upwards through the tower, the particulate solid material merely dropping off the edge of one tray 13 on to the cone 9, and then off the edge of the cone 9 on to the next tray 13. FIGURE 2b shows what happens when a gas is passed upwards through a tower; the lower edge of the cone 9 forms a restricted annular orifice 20 with the top surface of the tray 13, so that the gas velocity is increased, and throws the solid feed up the inclined surface of the tray as indicated by the arrows 21, and as the feed tends to pass down the surface of the cone 9 in a thin screen, intimate mixing occurs between the feed and the gas. In this manner, the feed can be first of all dried and then preheated.

The cones 9 and trays 13 may be formed of stainless steel and in the embodiments shown have an angle of inclination of 45°; the cones and trays are self-supporting, and the bottom cone has its base lined with refractory material, in order to serve as a radiation shield to withstand the high temperature gases (1,000° C. to 1,200° C.) from the fluidized bed 2. The base of the bottom tray 13 in FIGURE 3 is preferably likewise protected.

For servicing the cones 9 and trays 13, the cones 9 may be arranged such that they can be lowered fully to close the openings in the trays and side man holes can be provided for entering each section.

Figure 3:
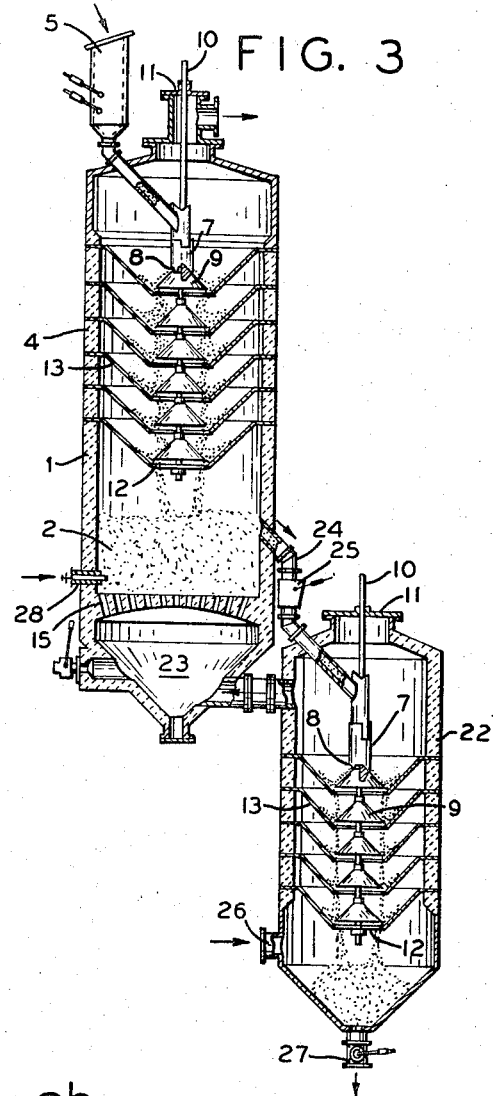
FIGURE 3 is an elevation, mainly in vertical section, of a fluidized bed apparatus incorporating heat-exchange apparatus in accordance with the invention to preheat the solid feed and to preheat the combustion air.

The apparatus of FIGURE 3 is similar in many respects to that of FIGURE 1, and like references are used for like parts. However, it will be noted that there is a second heat-exchange tower 22 to take the place of the bed 3, in FIGURE 1, for preheating the gases entering the distribution chamber 23 of a fluidized bed 2. The product outlet 24 of the fluidized bed 2 is controlled by a flap valve 25, and leads to the distributor 7 of the tower 22. The tower 22 has a gas inlet 26 and a product outlet 27. For lower operating temperatures, heat shields may not be necessary, as shown in FIGURE 1.

For convenience in manipulating the control shaft 10, the tower 22 is shown off-set from the fluidized bed 2 and tower 4, but with suitable modifications the tower 22, bed 2 and tower 4 could be co-axial.

The tower 4 of FIGURES 1 and 3 achieves in seven or six stages the heat-exchange one could expect to achieve in three preheat fluidized bed units, and can thus give a large saving in height; although this height saving does not necessarily apply to the tower 22, high thermal efficiency may be achieved in this tower.

In operation, the solids to be treated and the gas move generally in a countercurrent relationship with the finely divided solids entering the preheat compartment or heat-exchange tower 4 through a suitable feed distribution device 7 and passing successively over cone and tray surfaces 9 and 13, respectively, wherein they are preheated by the hot gas uprising from the fluidized bed 2. The preheated solids fall into bed 2, where they are calcined and thereafter the calcined solids are transferred to the cooling bed 3 or in the embodiment of FIGURE 3, a cooling compartment or tower 22 where they come in contact with relatively cool fluiding gas introduced via conduit 26. The fluidizing gas enters into the lower portion of compartment 22 and passes in countercurrent heat-exchange with the downwardly moving treated solids coming from the calcination bed. The fluidizing gas enters the reactor at a temperature generally lower than the temperature of the calcined solids and by direct heat-exchange the solids in compartment 22 are cooled whereas the fluidizing gas uprising therethrough is preheated. The preheated fluidizing gas passes through tuyeres 15 in the constriction plate and fluidizes the solids in the calcination bed 2. The temperature of the calcination bed is maintained in the range of about 1000° to 1200° C. by combustion of fuel introduced directly into the calcination bed such as by a fuel gun indicated generally by reference number 28. The hot fluidizing gas and entrained fines pass out of the freeboard space above the fluidized bed 2 directly into compartment or tower 4 wherein it preheats the downwardly moving incoming solids.

From the foregoing description it is evident that the objects of this invention together with many practical advantages are successfully achieved. While the preferred embodiments of my invention have been described further modifications may be made without departing from the scope of this invention.

Therefore, it is to be understood that all matters herein set forth or shown in the accompanying drawings are to be interpreted in an illustrative and not in a limiting sense.

I claim:

1. Apparatus for the countercurrent treatment of particulate solid material with gas, comprising a substantially vertical vessel having inlet means for introducing solid material near the upper end thereof and outlet means for withdrawing treated solids near the lower end thereof, a plurality of successive upwardly facing impervious cone-like members and downwardly facing centrally apertured but otherwise impervious conical tray members in said vessel arranged to permit progressive downward movement of said solid material over each of said cone and tray members, said members forming an adjustable restricted annular opening between each of said cone-like members and said tray members, said tray members being sealed to the vessel wall, means connecting each of said cone-like members for vertical unison movement thereof, said movement uniformly adjusting the size of each of said annular openings relative to each other, means for introducing gas into said vessel near the lower end thereof, said gas passing upwards in countercurrent flow with the downwardly moving solid material, and said cone and tray members being further arranged so that the solid material passes across the path of gas flow in passing from one member to another.

2. Apparatus according to claim 1, wherein there is further provided a fluidized bed of solids located below said cone and tray members and in communication therewith for receiving solids passing over said cone and tray members and means for introducing hot gas below said bed for fluidizing the solids therein.

3. Apparatus according to claim 2, wherein said cone and tray members act as a preheat compartment to preheat the solids with relatively hot gas uprising from said fluidized bed.

4. Apparatus according to claim 1, wherein there is further provided a fluidized bed of solids above said cone and tray members and in communication therewith, means for transferring solids from said bed to said inlet means so that said solids after treatment in the fluidized bed pass over said members, and means for supplying a relatively cool gas to said means for introducing gas to said vessel.

5. Apparatus according to claim 1, wherein there is provided a fluidized bed of solids to be treated intermediate said cone and tray members whereby said members above said bed act as a preheat compartment to preheat incoming particulate solids with hot fluidizing gas uprising from said fluidized bed and the cone and tray members below said bed act as a cooling compartment to cool hot solids discharged from said fluidized bed with said incoming gas.

6. Process of heat treating particulate solid material with gas, comprising establishing and maintaining in a treatment zone a fluidized bed of solids undergoing treatment, establishing above said fluidized bed a preheat zone containing a plurality of inclined surfaces including upwardly facing cone-like members and downwardly facing centrally apertured conical tray members arranged so that the solids pass downward in cascade over the inclined surfaces, introducing solids to be treated into said preheat zone, introducing fluidizing gas below said fluidized bed for fluidizing said solids, passing the gas uprising from said bed into said preheat zone in countercurrent flow with said downwardly moving solids, arranging said inclined surfaces to form a restricted annular opening between each of said cone-like members and said tray members, adjusting the size of said restricted openings by unison movement of said cone-like members, maintaining the velocity of the gas passing through each of said restricted openings at a uniform rate relative to the velocity at each of the other openings, and controlling the rate of said velocity so that at least some of the downwardly moving solids are thrown back on said inclined surfaces.

7. Process according to claim 6 wherein there is provided a cooling zone below said fluidized bed said zone containing a plurality of said inclined surfaces for receiving treated solids from said fluidized bed and further provided with means for introducing relatively cool gas below said inclined surfaces for countercurrent flow with said solids.

8. Process according to claim 6 wherein the solids flow over the inclined surfaces as a thin screen of material between one-eighth inch and three-eighth inch in thickness.

9. Process according to claim 6 wherein the velocity of the rising gas passing through said restricted opening is 15 to 35 f.p.s.

References Cited

UNITED STATES PATENTS

| | | | |
|---|---|---|---|
| 2,073,553 | 3/1937 | Dienst | 34—178 X |
| 2,077,346 | 4/1937 | Voskamp | 34—10 |
| 3,273,257 | 9/1966 | Johnson et al. | 34—171 X |
| 248,912 | 11/1881 | Campbell | 34—178 X |
| 654,093 | 7/1900 | Emerick | 34—171 X |
| 1,383,921 | 7/1921 | Fredel et al. | 34—171 |
| 2,584,312 | 2/1952 | White | 263—21 X |
| 2,668,041 | 2/1954 | Knibbs | 34—57 X |
| 2,833,622 | 5/1958 | Roberts et al. | 263—21 X |

FOREIGN PATENTS 528,407  8/1921  France.

ROBERT A. O'LEARY, *Primary Examiner.*

ALBERT W. DAVIS, JR., *Assistant Examiner.*

U.S. Cl. X.R.

34—57, 171, 178; 263—21, 30